Reissued Aug. 9, 1949 Re. 23,140

UNITED STATES PATENT OFFICE 23,140

SYNTHETIC LUBRICANT

Orland M. Reiff, Woodbury, Howard D. Hartough, Pitman, and Harry J. Andress, Jr., Woodbury, N. J., assignors to Socony-Vacuum Oil Company, Incorporated, a corporation of New York No Drawing. Original No. 2,443,083, dated June 8, 1948, Serial No. 540,145, June 13, 1944. Application for reissue January 6, 1949, Serial No. 69,618

14 Claims. (Cl. 252—57)

This invention has to do with the art of lubrication and, more particularly, has to do with the preparation of synthetic lubricants.

In the lubricant art, considerable progress has been realized in recent years in the production of lubricants characterized by one or more specific properties and adapted for particular uses. In the main, this progress can be attributed to two developments: the first, new refining procedures and, the second, addition agents capable of imparting particular properties to available lubricants. Although these lubricants are somewhat superior to those formerly available in the art, in general, they too suffer in one or more respects. For example, while such oils may have superior viscosity characteristics, etc., they may have undesirable oxidation characteristics, etc. Recently, however, in an effort to obtain superior lubricants endowed with specific and superior characteristics, a new field has been explored, namely, the synthesis of lubricants from various materials. The products so obtained have been aptly described in the art as "synthetic lubricants."

While many of the synthetic lubricants recently prepared have been found to be desirable for various uses in view of a superior characteristic such as improved oiliness, viscosity, resistance to oxidation, etc., they invariably have extremely high pour points which naturally militate against their wide use in the art. Generally, they suffer too from the disadvantage of a failure to respond to pour point depressants when the latter are incorporated therewith in relatively small amounts.

The present invention is predicated upon the discovery of a new and novel class of synthetic lubricants—paraffin wax xylenes—which are characterized by relatively low pour points and which are responsive to substantial pour point depression upon the addition thereto of small amounts of a novel class of pour point depressants, the esters of alkyl-substituted phenols. The synthetic lubricants of this invention, in combination with the said pour point depressants, are all characterized by pour points of 0° F. (A. S. T. M.) and are further characterized by outstanding viscosity index values and resistance to oxidation.

Also contemplated herein is a method for the preparation of the said new and novel synthetic lubricants, the method involving reacting certain partially halogenated paraffin waxes with xylene in the presence of a Friedel-Crafts catalyst at a condensation temperature and thereafter separating the catalyst and any unchanged reactants from the reaction mixture so obtained. While the present method may be briefly summarized by the foregoing statement, it is much more complex than as so stated, inasmuch as several of the factors recited therein are critical in nature and must be followed religiously lest products of a somewhat inferior character be formed. Specifically, the several critical factors, all of which are interrelated, include the following:

1. Type of paraffin wax,
2. Degree of halogenation of the paraffin wax and
3. Proportions of halogenated paraffin wax and of a xylene.

Of importance in the present method is the type of paraffin wax used. We have found that when a crystalline paraffin wax having a melting point not greater than about 140° F. is used, synthetic lubricants of relatively low pour point and susceptible to pour point depression are obtained. Particularly preferred waxes of this type, however, are those having melting points from about 120° F. to about 130° F. These waxes have a crystalline structure, as opposed to other paraffin waxes which do not have a well-defined crystal structure and are amorphous in character. The latter are commonly referred to as "amorphous" waxes, and are considered to be undesirable for the purposes of this invention, for such waxes would result in products having relatively high melting points and having comparatively little susceptibility to pour point depression. Of the waxes used herein, we have found that particularly outstanding results are obtained with a crystalline paraffin wax containing on the average of 24 carbon atoms and having a melting point of about 126° F. It is to be understood, however, that all crystalline paraffin waxes characterized by melting points not greater than about 140° F. and obtained from all sources, such as petroleum wax fractions, the Fischer-Tropsch synthesis, etc., are contemplated herein.

Accordingly, when used hereinafter, the expression "wax" unless otherwise qualified denotes the desired reactants: crystalline paraffin wax.

With regard to the degree of halogenation of wax which must be followed, it may first be said that all halogens may be used. In view of the relative cost, availability, etc., however, chlorine is preferred and, for this reason, the following description will be confined to the chlorinated waxes. It is essential that the chlorinated waxes reacted with a xylene contain from about 21 per cent to about 24 per cent chlorine. When chlorine concentrations in excess of the maxima, about 24 per cent, are used, the products obtained therefrom are characterized by relatively high viscosities and do not have sufficiently low pour points—0° F.—when small amounts of the aforesaid pour point depressants are incorporated therewith. Similarly, when chlorine concentrations lower than about 21 per cent are used, the products so obtained contain excessive amounts of wax and have undesirably high pour points, about 0° F.

It should be understood that a 21 per cent chlorinated wax is one prepared by introducing chlorine into a crystalline paraffin wax, as defined above, until the weight of the wax has increased about 21 per cent. Such a product is predominantly comprised of dichlorinated wax with substantial quantities of unchlorinated wax, mono-chlorowax and more highly chlorinated wax. It should also be understood that when other halogens are used in place of chlorine in the wax reactant, the foregoing percentage range from about 21 per cent to about 24 per cent, will be subject to change in proportion to the relative atomic weights of the individual halogens.

Of primary importance are the relative amounts or proportions of the reactants, namely, chlorinated wax and a xylene. In order to obtain the desired product, at least one mole of a xylene is reacted with an amount of chlorinated wax which contains one atomic weight of chlorine. In short, at least one mole of a xylene is used for each atomic weight of chlorine in the chlorinated wax reactant. Accordingly, it will be clear that the reaction products obtained with such proportions are predominantly monowax xylenes. If less than one mole of a xylene is used for each atomic weight of chlorine in a chlorowax, products of less desirable character are obtained. The latter products, unlike those contemplated herein, suffer from their failure to give pour points of 0° F. or lower when small amounts of the aforesaid pour point depressants are used therewith.

The reaction temperatures useful in the present method are those normally referred to in the art as Friedel-Crafts condensation temperatures. While temperatures from about 25° C. to about 145° C. may be used satisfactorily, the preferred reaction temperatures are about 135–145° C., the boiling points of xylenes.

The amount of catalyst used in the condensation should be relatively small, that is, a catalytic amount. Generally, amounts from about 1 per cent to about 10 per cent by weight of the chlorowax reactant are satisfactory, and amounts of the order of 3 per cent are preferred. Catalysts such as aluminum chloride, zinc chloride, ferric chloride, boron trifluoride, hydrogen fluoride, etc., serve the purpose of this invention; and for this reason, the catalysts are defined broadly herein as those capable of effecting a Friedel-Crafts type condensation. Particularly preferred, however, is aluminum chloride.

In order to more fully illustrate the method by which our synthetic lubricants are obtained, the following typical procedure is detailed hereinbelow.

Example

*Preparation of wax-xylene (1-21)*

Two moles of xylene (212 grams) and 170 grams of a 21 per cent chlorowax (126° F. A. S. T. M. melting point) are placed in a flask equipped with a thermometer, reflux condenser and an electrically driven stirrer. The chlorowax used contains 1 atomic weight of chlorine. Aluminum chloride (5 grams) is slowly added to the chlorowax and xylene at a temperature of about 25° C. while agitating the same. The temperature is then raised to the reflux temperature of the xylene—about 140° C.—and maintained for about 1 hour to complete the condensation of chlorowax and xylene. The reaction mixture is then purified by filtering through a contact clay to remove aluminum chloride. The filtrate is then heated to remove excess xylene and the residue obtained thereby is a wax-substituted xylene containing some unreacted wax, about 5 to 15 per cent unreacted wax. The unreacted wax is removed by vacuum distillation (it may also be removed by conventional dewaxing procedures).

The product is wax-xylene (1–21).

Parenthetical expressions (1–21) indicating that xylene is substituted with 1 wax group and that the chlorowax used in the preparation thereof contained 21 per cent chlorine are used hereinafter to so identify each product illustrative of the present invention, as well as related products which do not possess the superior characteristics of the lubricants prepared as outlined above.

It will be understood, of course, that any unreacted xylene can be used again in the preparation of additional product, and that unreacted wax can be further chlorinated for future use.

Although we have illustrated our synthetic lubricants by a product free of unreacted wax (removed by vacuum distillation, solvent dewaxing, etc.), it is to be understood that it is not essential that all of the unreacted wax be removed. Accordingly, both wax-free synthetic lubricants and synthetic lubricants containing relatively small amounts of unreacted wax are contemplated herein.

In order to illustrate the superior characteristics of the synthetic lubricants of the present invention, several typical examples are presented hereinbelow in Table I. There, the S. U. V. at 210° F., viscosity index and A. S. T. M. pour test of the above synthetic lubricants are shown; all of these characteristics and methods for determining the same are well known and need not be further described at this point. In addition, the response of these synthetic lubricants with and without a pour point depressant is also demonstrated. Also present in Table I for comparison with the synthetic lubricants contemplated herein are several typical products which are much less desirable for use as lubricants for one reason or another. For convenience in identifying the latter products, they are preceded by an "X" in Table I.

*Table I*

| Product | S. U. V. @ 210° F. | V. I. | A. S. T. M. Pour Test, °F. | A. S. T. M. Pour Test (°F.) with ½% A[1] |
|---|---|---|---|---|
| X wax-xylene (1–12) | 44.4 | 119.0 | +25 | +15 |
| Wax-xylene (1–21) | 63.6 | 89.5 | +20 | −5 |
| Wax-xylene (1–24) | 75.4 | 75.5 | +20 | −5 |
| X wax-xylene (1–27) | 124.0 | 49.7 | +25 | +10 |
| X wax-xylene (1–28) | 127.2 | 47.3 | +20 | +15 |

[1] A = pour depressant: tetra-wax phenol phthalate.

It will be clear on inspection of the pour test results set forth in Table I that wax-xylenes prepared from a chlorowax containing 12, 27 and 28 per cent chlorine do not give pour points of 0° F.

and lower when a small amount of pour depressant A is incorporated therein. Surprisingly, however, when the chlorowax reactant contains from about 21 per cent to about 24 per cent chlorine, the wax-xylenes obtained therefrom are susceptible of a pour point lowering to at least 0° F. when small amounts of pour depressant A are added thereto.

It will be further noted from inspection of the results provided in Table I that the wax-xylenes (1–21) to (1–24) have viscosities (S. U. V. @ 210° F.) and viscosity indexes which make them extremely valuable lubricants, suitable for automotive and aviation use.

To illustrate the critical nature of the proportions of xylene and of the halogen wax reactants in obtaining the synthetic lubricants of this invention, and those related materials of somewhat inferior character, several typical examples of wax-xylenes are shown in Table II below. The data in this table are similar to those shown in Table I above and the products not contemplated herein are again identified by the letter "X" which precedes them, as "X wax-xylene (3–21)."

*Table II*

| Product | S. U. V. @ 210° F. | V. I. | A. S. T. M. Pour Test, ° F. | A. S. T. M. Pour Test (° F.) with ½% A [1] |
|---|---|---|---|---|
| Wax-xylene (1–21) | 63.6 | 89.5 | +20 | −5 |
| Wax-xylene (1–24) | 75.4 | 75.5 | +20 | −5 |
| X wax-xylene (3–21) | 53.7 | 110.9 | +20 | +20 |
| X wax-xylene (3–24) | 55.8 | 110.1 | +20 | +20 |

[1] A = pour depressant: tetra-wax phenol phthalate.

It will be seen that wax-xylenes (1–21) and (1–24) in Table II have pour points of less than 0° F. with pour point depressant A. Yet, wax-xylenes prepared with chlorowaxes containing the same percentages (21 and 24) of chlorine as those used in the prepaartion of the aforesaid monowax synthetic lubricants, but prepared with more than one mole of a xylene for each atomic weight of chlorine in the chlorowax are not so favorably characterized.

In Tables I and II above, tetra-wax phenol phthalate—which is preferred—is used to illustrate the class of pour point depressants contemplated herein. It is to be understood, however, that all esters of alkyl-substituted phenols, particularly those in which the alkyl substituent is paraffin wax, are broadly contemplated. Such depressants are described in detail in Patent Nos. 2,048,465 and 2,048,466, issued to O. M. Reiff et al. Although varying amounts of these materials may be used herein, satisfactory results are obtained with concentrations of from about 0.125 per cent to about 1.0 per cent.

We claim:

1. A lubricant of low pour point comprising a synthetic lubricant having incorporated therewith a small amount, sufficient to characterize the said lubricant with a pour point at least as low as 0° F., of an ester of an alkyl-substituted phenol, said synthetic lubricant being prepared from a crystalline paraffin wax having a melting point not greater than about 140° F. and a xylene by: partially halogenating the crystalline paraffin wax to form a mixture of halogenated wax and substantially unhalogenated wax containing an amount of halogen corresponding to from about 21 per cent to about 24 per cent chlorine; mixing the halogenated wax and unhalogenated wax with said xylene in the proportion of at least one mole of xylene to each atom of halogen in the halogenated wax mixture; adding thereto a catalyst capable of effecting a Friedel-Crafts type condensation; heating the mixture thus obtained at a Friedel-Crafts condensation temperature until substantially all of the halogenated wax has reacted with said xylene; and separating the Friedel-Crafts catalyst, unreacted xylene and unhalogenated wax from the reaction mixture so obtained, to obtain said synthetic lubricant.

2. A lubricant of low pour point comprising a synthetic lubricant having incorporated therewith a small amount, sufficient to characterize the said lubricant with a pour point at least as low as 0° F., of an ester of an alkyl-substituted phenol, said synthetic lubricant being prepared from a crystalline paraffin wax having a melting point not greater than about 140° F. and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a Friedel-Crafts catalyst thereto; heating the mixture thus obtained under refluxing conditions to the refluxing temperature of said xylene until substantially all of the chlorinated wax has reacted with said xylene; and separating the Friedel-Crafts catalyst, unreacted xylene and unchlorinated wax from the reaction mixture so obtained, to obtain said synthetic lubricant.

3. A lubricant of low pour point comprising a synthetic lubricant having incorporated therewith a small amount, sufficient to characterize the said lubricant with a pour point at least as low as 0° F., of an ester of an alkyl-substituted phenol, said synthetic lubricant being prepared from a crystalline paraffin wax having a melting point between about 120° F. and about 130° F., and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a Friedel-Crafts catalyst thereto; heating the mixture thus obtained under refluxing conditions to the refluxing temperature of said xylene until substantially all of the chlorinated wax has reacted with said xylene; and separating the Friedel-Crafts catalyst, unreacted xylene and unchlorinated wax from the reaction mixture so obtained, to obtain said synthetic lubricant.

4. A lubricant of low pour point comprising a synthetic lubricant having incorporated therewith a small amount, sufficient to characterize the said lubricant with a pour point at least as low as 0° F., of an ester of an alkyl-substituted phenol, said synthetic lubricant being prepared from a crystalline paraffin wax having an average of about 24 carbon atoms and a melting point of about 126° F., and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a Friedel-Crafts catalyst thereto; heating the mixture thus obtained under refluxing conditions to the refluxing temperature of said xylene until substantially all of the chlorinated wax has reacted with said xylene; and separating the Friedel-Crafts catalyst, unreacted xylene and unchlorinated wax from the reaction mixture so obtained to obtain said synthetic lubricant.

5. A lubricant of low pour point comprising a synthetic lubricant having incorporated therewith a small amount, sufficient to characterize the said lubricant with a pour point at least as low as 0° F., of an ester of an alkyl-substituted phenol, said synthetic lubricant being prepared from a crystalline paraffin wax having a melting point not greater than about 140° F. and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a catalytic amount of aluminum chloride thereto; heating the mixture thus obtained under refluxing conditions to the refluxing temperature of said xylene until substantially all of the chlorinated wax has reacted with said xylene; and separating the aluminum chloride, unreacted xylene and unchlorinated wax from the reaction mixture so obtained, to obtain said synthetic lubricant.

6. A lubricant of low pour point comprising a synthetic lubricant having incorporated therewith a small amount, sufficient to characterize the said lubricant with a pour point at least as low as 0° F., of an ester of an alkyl-substituted phenol, said synthetic lubricant being prepared from a crystalline paraffin wax having a melting point not greater than about 140° F. and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a Friedel-Crafts catalyst thereto; heating the mixture thus obtained at about 140° C. until substantially all of the chlorinated wax has reacted with said xylene; and separating the Friedel-Crafts catalyst, unreacted xylene and unchlorinated wax from the reaction mixture so obtained, to obtain said synthetic lubricant.

7. A lubricant of low pour point comprising a synthetic lubricant having incorporated therewith a small amount, sufficient to characterize the said lubricant with a pour point at least as low as 0° F., of an ester of a wax-substituted phenol, said synthetic lubricant being prepared from a crystalline paraffin wax having a melting point not greater than about 140° F. and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a Friedel-Crafts catalyst thereto; heating the mixture thus obtained under refluxing conditions to the refluxing temperature of said xylene until substantially all of the chlorinated wax has reacted with said xylene; and separating the Friedel-Crafts catalyst, unreacted xylene and unchlorinated wax from the reaction mixture so obtained, to obtain said synthetic lubricant.

8. A lubricant of low pour point comprising a synthetic lubricant having incorporated therewith a small amount, sufficient to characterize the said lubricant with a pour point at least as low as 0° F., of tetrawax phenol phthalate, said synthetic lubricant being prepared from a crystalline paraffin wax having a melting point not greater than about 140° F. and a xylene by: partially chlorinating the crystalline paraffin wax to form a mixture of chlorinated wax and unchlorinated wax containing from about 21 per cent to about 24 per cent chlorine; mixing the chlorinated wax and unchlorinated wax with said xylene in the proportion of at least one mole of xylene to each atom of chlorine in the chlorinated wax mixture; adding a Friedel-Crafts catalyst thereto; heating the mixture thus obtained under refluxing conditions to the refluxing temperature of said xylene until substantially all of the chlorinated wax has reacted with said xylene; and separating the Friedel-Crafts catalyst, unreacted xylene and unchlorinated wax from the reaction mixture so obtained, to obtain said synthetic lubricant.

9. The method of preparing a lubricant having a pour point at least as low as 0° F. which comprises: partially halogenating a crystalline paraffin wax having a melting point not greater than about 140° F. to form a mixture of halogenated wax and substantially unhalogenated wax containing an amount of halogen corresponding to from about 21 per cent to about 24 per cent chlorine; mixing the halogenated wax and unhalogenated wax mixture with a xylene in the proportion of at least one mole of xylene to each atom of halogen in the halogenated wax mixture; adding thereto a catalyst capable of effecting a Friedel-Crafts type condensation; heating the mixture thus obtained at a Friedel-Crafts condensation temperature until substantially all of the halogenated wax has reacted with said xylene; separating the Friedel-Crafts catalyst, unreacted xylene and unhalogenated wax from the reaction mixture so obtained; and adding thereto a small amount sufficient to characterize the said lubricant with a pour point at least as low as 0° F. of an ester of an alkyl-substituted phenol.

10. The method of preparing a lubricant having a pour point at least as low as 0° F. which comprises: partially chlorinating a crystalline paraffin wax having a melting point not greater than about 140° F. to form a mixture of chlorinated wax and substantially unchlorinated wax containing from about 21 per cent to about 24 per cent chlorine; mixing the chlorinated wax and unchlorinated wax mixture with a xylene in the proportion of at least one mole of xylene to each atom of chlorine in the chlorinated wax mixture; adding thereto a Friedel-Crafts catalyst; heating the mixture thus obtained under refluxing conditions to the refluxing temperature of xylene until substantially all of the chlorinated wax has reacted with said xylene; separating the Friedel-Crafts catalyst, unreacted xylene and unchlorinated wax from the reaction mixture so obtained; and adding thereto a small amount sufficient to characterize the said lubricant with a pour point at least as low as 0° F. of an ester of an alkyl-substituted phenol.

11. The method of preparing a lubricant having a pour point at least as low as 0° F. which comprises: partially halogenating a crystalline paraffinic wax having a melting point not greater than about 140° F. to form a mixture of halogenated wax and substantially unhalogenated wax containing an amount of halogen corresponding to from about 21 per cent to about 24 per cent chlorine; mixing the halogenated wax and unhalogenated wax mixture with a xylene in the proportion of at least one mole of xylene to each atom of halogen in the halogenated wax mixture; adding thereto a catalyst capable of effecting a Friedel-Crafts type condensation; heating the mixture thus obtained at a Friedel-Crafts condensation temperature until substantially all of the halogenated wax has reacted with said xylene; separating the Friedel-Crafts catalyst, unreacted xylene and unhalogenated wax from the reaction mixture so obtained; and adding thereto a small amount sufficient to characterize the said lubricant with a pour point at least as low as 0° F. of an ester of an alkyl-substituted phenol.

12. The method of preparing a lubricant having a pour point at least as low as 0° F. which comprises: partially chlorinating a crystalline paraffin wax having a melting point not greater than about 140° F. to form a mixture of chlorinated wax and substantially unchlorinated wax containing from about 21 per cent to about 24 per cent chlorine; mixing the chlorinated wax and unchlorinated wax mixture with a xylene in the proportion of at least one mole of xylene to each atom of chlorine in the chlorinated wax mixture; adding thereto a Friedel-Crafts catalyst; heating the mixture thus obtained under refluxing conditions to the refluxing temperature of xylene until substantially all of the chlorinated wax has reacted with said xylene; separating the Friedel-Crafts catalyst, unreacted xylene and unchlorinated wax from the reaction mixture so obtained; and adding thereto a small amount sufficent to characterize the said lubricant with a pour point at least as low as 0° F. of an ester of an alkyl-substituted phenol.

13. The method of preparing a lubricant having a pour point at least as low as 0° F., which comprises: partially halogenating a crystalline paraffin wax having a melting point not greater than about 140° F. to form a mixture of halogenated wax and substantially unhalogenated wax containing an amount of halogen corresponding to from about 21 per cent to about 24 per cent chlorine; mixing the halogenated wax and unhalogenated wax mixture with a xylene in the proportion of at least one mole of xylene to each atom of halogen in the halogenated wax mixture; adding thereto a catalyst capable of effecting a Friedel-Crafts type condensation; heating the mixture thus obtained at a Friedel-Crafts condensation temperature until substantially all of the halogenated wax has reacted with said xylene; separating the Friedel-Crafts catalyst, unreacted xylene and unhalogenated wax from the reaction mixture so obtained; and adding thereto a small amount sufficient to characterize the said lubricant with a pour point at least as low as 0° F. of tetrawax phenol phthalate.

14. The method of preparing a lubricant having a pour point at least as low as 0° F. which comprises: partially chlorinating a crystalline paraffin wax having a melting point not greater than about 140° F. to form a mixture of chlorinated wax and substantially unchlorinated wax containing from about 21 per cent to about 24 per cent chlorine; mixing the chlorinated wax and unchlorinated wax mixture with a xylene in the proportion of at least one mole of xylene to each atom of chlorine in the chlorinated wax mixture; adding thereto a Friedel-Crafts catalyst; heating the mixture thus obtained under refluxing conditions to the refluxing temperature of xylene until substantially all of the chlorinated wax has reacted with said xylene; separating the Friedel-Crafts catalyst, unreacted xylene and unchlorinated wax from the reaction mixture so obtained; and adding thereto a small amount sufficient to characterize the said lubricant with a pour point at least as low as 0° F. of tetrawax phenol phthalate.

ORLAND M. REIFF.
HOWARD D. HARTOUGH.
HARRY J. ANDRESS, JR.

No references cited.